US011005605B2

(12) United States Patent
Suzuki

(10) Patent No.: US 11,005,605 B2
(45) Date of Patent: May 11, 2021

(54) COMMUNICATION APPARATUS AND COMMUNICATION METHOD

(71) Applicant: RENESAS ELECTRONICS CORPORATION, Tokyo (JP)

(72) Inventor: Takayuki Suzuki, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/545,495

(22) Filed: Aug. 20, 2019

(65) Prior Publication Data

US 2019/0372722 A1 Dec. 5, 2019

Related U.S. Application Data

(63) Continuation of application No. 15/702,358, filed on Sep. 12, 2017, now abandoned.

(30) Foreign Application Priority Data

Sep. 16, 2016 (JP) .................................. 2016-181854

(51) Int. Cl.
*H04L 1/18* (2006.01)

(52) U.S. Cl.
CPC ............ *H04L 1/1858* (2013.01); *H04L 1/188* (2013.01); *H04L 1/1825* (2013.01)

(58) Field of Classification Search
None
See application file for complete search history.

(56) References Cited

U.S. PATENT DOCUMENTS

| 6,788,953 | B1 | 9/2004 | Cheah et al. |
| 8,412,997 | B2 | 4/2013 | Qian et al. |
| 2001/0027486 | A1 | 10/2001 | Takamoto et al. |
| 2002/0045435 | A1 | 4/2002 | Fantaske |

(Continued)

FOREIGN PATENT DOCUMENTS

JP 2004-260562 A 9/2004

OTHER PUBLICATIONS

U.S. PTO Non-Final Office Action issued in related parent U.S. Appl. No. 15/702,358, dated Nov. 2, 2018.

(Continued)

*Primary Examiner* — Phirin Sam
*Assistant Examiner* — Tarell A Hampton
(74) *Attorney, Agent, or Firm* — McDermott Will & Emery LLP

(57) ABSTRACT

The efficiency of signal transmission is improved. A communication apparatus includes a memory unit, a communication control unit, and an updating unit. A retransmission interval value is stored in the memory unit. The communication control unit transmits a first signal and receives a response signal corresponding to the first signal from a receiver. If the received response signal is a negative response signal, the first signal is retransmitted at a time interval longer than or equal to the retransmission interval value stored in the memory unit, from the transmission of the first signal. The updating unit updates the retransmission interval value stored in the memory unit, according to a time from the transmission of the first signal to the reception of the positive response signal corresponding to the first signal.

9 Claims, 10 Drawing Sheets

(56) References Cited

U.S. PATENT DOCUMENTS

| | | |
|---|---|---|
| 2002/0069417 A1 | 6/2002 | Kliger et al. |
| 2002/0167948 A1 | 11/2002 | Chen |
| 2003/0212816 A1 | 11/2003 | Bender et al. |
| 2003/0217206 A1* | 11/2003 | Poo .................... G06F 3/0607 710/68 |
| 2004/0165543 A1 | 8/2004 | Nakazawa |
| 2004/0260831 A1 | 12/2004 | Dyck et al. |
| 2005/0041581 A1 | 2/2005 | Kuusinen et al. |
| 2005/0091564 A1 | 4/2005 | Oshita et al. |
| 2005/0169199 A1 | 8/2005 | Futenma et al. |
| 2005/0190720 A1 | 9/2005 | Miyake et al. |
| 2006/0034176 A1 | 2/2006 | Lindsay |
| 2006/0165029 A1 | 7/2006 | Melpignano et al. |
| 2013/0019034 A1* | 1/2013 | Lida ................... H04L 12/2832 710/38 |
| 2013/0031283 A1 | 1/2013 | Tsuji |
| 2014/0013013 A1* | 1/2014 | Herrity .............. G06F 13/4045 710/18 |
| 2016/0278072 A1 | 9/2016 | Palle et al. |

OTHER PUBLICATIONS

U.S. PTO Final Office Action issued in related parent U.S. Appl. No. 15/702,358, dated Mar. 20, 2019.

* cited by examiner

COMMUNICATION APPARATUS AND COMMUNICATION METHOD

CROSS-REFERENCE TO RELATED APPLICATIONS

This is a Continuation of U.S. patent application Ser. No. 15/702,358 filed on Sep. 12, 2017 which claims the benefit of Japanese Patent Application No. 2016-181854 filed on Sep. 16, 2016 including the specification, drawings and abstract are incorporated herein by reference in their entirety.

BACKGROUND

As a known technique for increasing the reliability of signal transmission of the related art, for example, retransmission control is disclosed in Japanese Unexamined Patent Application Publication No. 2004-260562.

SUMMARY

The present invention relates to a communication apparatus and a communication method.

Regarding signal transmission, transmission efficiency is also requested.

Considering requests on transmission efficiency, the present inventors have found the following problem:

In the retransmission control disclosed in Japanese Unexamined Patent Application Publication No. 2004-260562, retransmission intervals are fixed values and thus retransmission may be repeated many times in, for example, heavy traffic on a communication path between a transmitter and a receiver. Thus, the band of the communication path may be occupied by retransmission so as to reduce transmission efficiency.

Other problems and new features will be clarified by a description of the present specification and the accompanying drawings.

According to an embodiment, a communication apparatus transmits a first signal and receives a response signal corresponding to the first signal from a receiver. If the communication apparatus receives a negative response signal, the first signal is retransmitted at a time interval longer than or equal to a set retransmission interval value after the transmission of the first signal, and the set retransmission interval value is updated according to a time from the transmission of the first signal to the reception of the response signal.

The embodiment can increase the efficiency of signal transmission.

DETAILED DESCRIPTION

Embodiments will be described below with reference to the accompanying drawings. The same elements are indicated by the same reference symbols and a redundant explanation thereof is omitted.

First Embodiment

<Outline of a Communication System>

Figure 1:
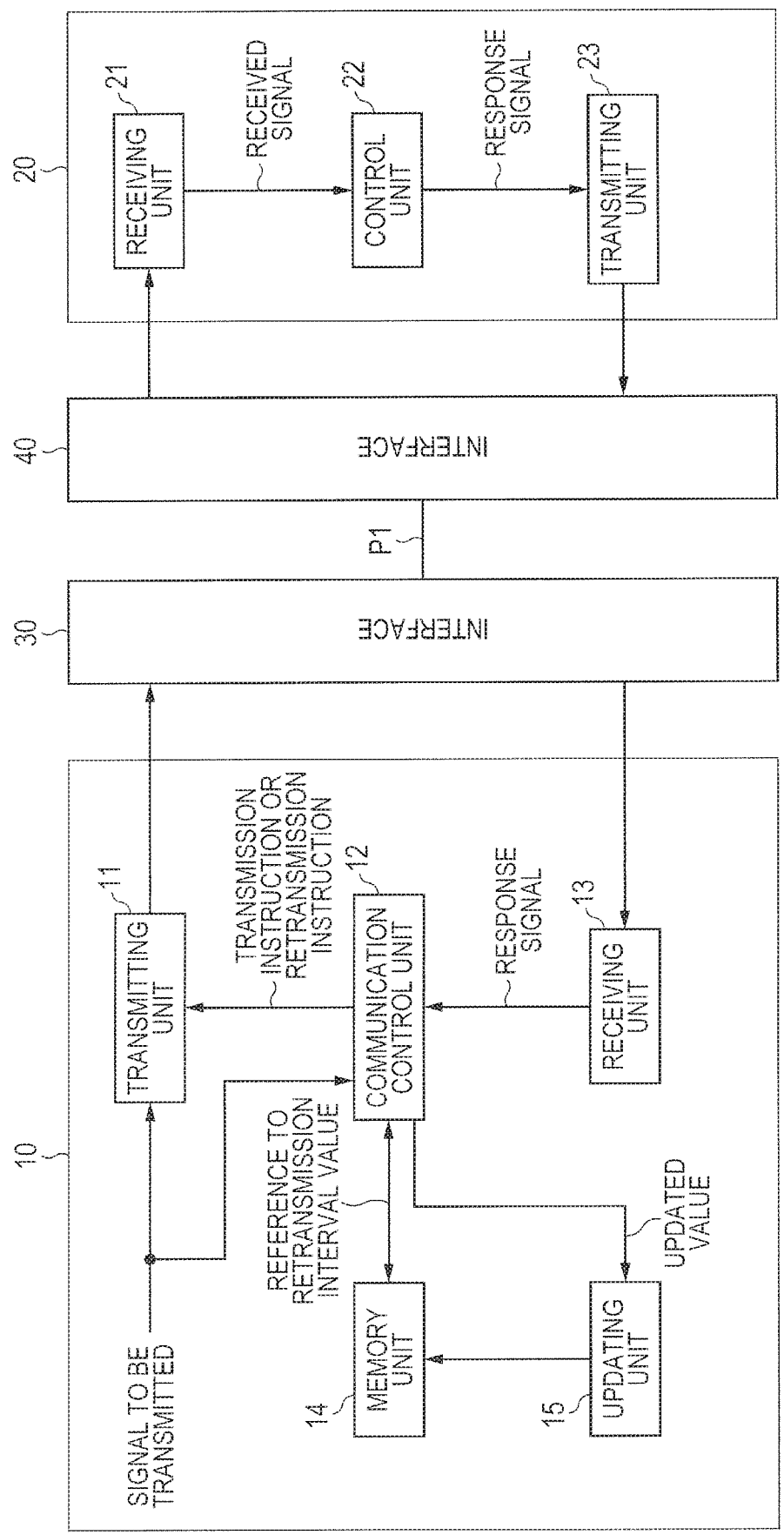
FIG. 1 shows an example of a communication system according to a first embodiment.

FIG. 1 shows an example of a communication system according to a first embodiment. In FIG. 1, a communication system 1 includes communication apparatuses 10 and 20, interfaces 30 and 40, and a transmission line P1.

The communication apparatus 10 transmits a signal to be transmitted to the communication apparatus 20 on the other end. In other words, the communication apparatus 10 operates as a "transmission node" in this configuration. The signal transmitted from the communication apparatus 10 reaches the communication apparatus 20 through the interface 30, the transmission line P1, and the interface 40. In this case, the communication apparatus 10 and the communication apparatus 20 may have wired or wireless coupling. In the case of wired coupling, the transmission line P1 may be, for example, a communication line and the interfaces 30 and 40 may be, for example, connectors. In the case of wireless coupling, the transmission line P1 may be, for example, a radio transmission line and the interfaces 30 and 40 may be, for example, radio antennas.

The communication apparatus 20 receives the signal transmitted from the communication apparatus 10. In other words, the communication apparatus 20 operates as a "reception node" in this configuration. When receiving the signal transmitted from the communication apparatus 10, the communication apparatus 20 transmits a response signal to the communication apparatus 10. In this case, the response signal is a positive response signal or a negative response signal. For example, a positive response signal may be transmitted when the signal transmitted from the communication apparatus 10 can be correctly received, whereas a negative response signal may be transmitted when the signal transmitted from the communication apparatus 10 cannot be correctly received. In other words, the positive response signal and the negative response signal may be an ACK signal and a NACK signal, respectively. For example, if the signal transmitted from the communication apparatus 10 is a request signal indicating a request to the communication apparatus 20, the positive response signal may be transmitted when the communication apparatus 20 accepts the request, whereas the negative response signal may be transmitted when the request is declined. In the following explanation, the positive response signal and the negative response signal will be described as an ACK (ACKnowledgement) signal and a NACK (Negative ACKnowledgement) signal, respectively, unless otherwise specified.

When receiving the positive response signal that corresponds to the signal (will be referred to as "first signal") transmitted by the communication apparatus 10 and is transmitted from the communication apparatus 20, the communication apparatus 10 may transmit a second signal to the communication apparatus 20 subsequently to the first signal after a predetermined time from the reception of the positive response signal. In this case, it is assumed that the first signal and the second signal are a series of packet signals.

When receiving the negative response signal that corresponds to the signal (will be referred to as "first signal") transmitted by the communication apparatus 10 and is transmitted from the communication apparatus 20, the communication apparatus 10 retransmits the first signal to the communication apparatus 20.

In this case, the communication apparatus 10 retransmits the first signal at a time interval longer than or equal to "set retransmission interval value" after the transmission of the first signal. Moreover, the communication apparatus 10 updates "set retransmission interval value" based on a time from the transmission of the first signal to the reception of the positive response signal corresponding to the first signal. Thus, at the retransmission of the second signal transmitted after the first signal, the communication apparatus 10 can retransmit the signal according to a retransmission interval value adjusted based on the actual transmission time of the first signal. This can prevent transmission efficiency from being reduced by repeatedly retransmitting the same signal so as to occupy the band of the transmission line P1. In other words, the signal can be transmitted with higher efficiency.

<Configuration Example of the Transmission Node>

As described above, the communication apparatus 10 operates as a transmission node and thus the configuration of the communication apparatus 10 will be discussed below. In FIG. 1, the communication apparatus 10 includes a transmitting unit 11, a communication control unit 12, a receiving unit 13, a memory unit 14, and an updating unit 15.

The transmitting unit 11 receives a signal to be transmitted. When receiving a transmission instruction from the communication control unit 12, the transmitting unit 11 performs a predetermined transmitting operation on the signal to be transmitted, and then sends the signal to the interface 30. Thus, the signal to be transmitted is transmitted to the communication apparatus 20 serving as a receiver. At this point, the transmitting unit 11 temporarily stores the transmitted signal in preparation for retransmission. The stored signal to be transmitted (will be referred to as "first signal") is deleted by the transmitting unit 11 when a transmission instruction on a signal (will be referred to as "second signal") to be transmitted subsequently to the first signal is received by the transmitting unit 11 from the communication control unit 12.

When receiving a retransmission instruction from the communication control unit 12, the transmitting unit 11 transmits the stored signal to the interface 30 to retransmit the stored signal indicated by the retransmission instruction.

The receiving unit 13 receives the response signal transmitted from the communication apparatus 20 and then outputs the received response signal to the communication control unit 12.

When receiving the first signal to be transmitted (will be referred to as "first signal"), the communication control unit 12 transmits a transmission instruction on the first signal to the transmitting unit 11. Thus, the first signal is transmitted from the transmitting unit 11. When receiving the second signal subsequent to the first signal, the communication control unit 12 receives the positive response signal for the first signal and then outputs the transmission instruction on the second signal to the transmitting unit 11. In this configuration, when receiving the positive response signal, the communication control unit 12 outputs "updated value" of the retransmission interval value to the updating unit 15. "Updated value" is based on a time from the transmission of the first signal to the reception of the positive response signal corresponding to the first signal. Moreover, if the positive response signal corresponding to the second signal is received, "updated value" outputted from the communication control unit 12 is based on a time from the transmission of the second signal to the reception of the positive response signal corresponding to the second signal. The "updated value" will be specifically described later.

If the response signal received from the receiving unit 13 is the negative response signal, the communication control unit 12 outputs a transmission instruction to the transmitting unit 11 at a time interval longer than or equal to the retransmission interval value (i.e., the set retransmission interval value) held (stored) in the memory unit 14, after the previous transmission (including retransmission) of the signal to be transmitted for the response signal. In other words, a signal to be transmitted is retransmitted at substantially the same interval as a retransmission interval value stored in the memory unit 14, after the previous transmission.

The updating unit 15 receives the updated value outputted from the communication control unit 12 and updates, according to the received updated value, the retransmission interval value stored in the memory unit 14. Specifically, the updating unit 15 updates the retransmission interval value based on a time from the transmission of the first signal to the reception of the positive response signal corresponding to the first signal. After that, the communication control unit 12 refers to the updated retransmission interval value.

Figure 2:
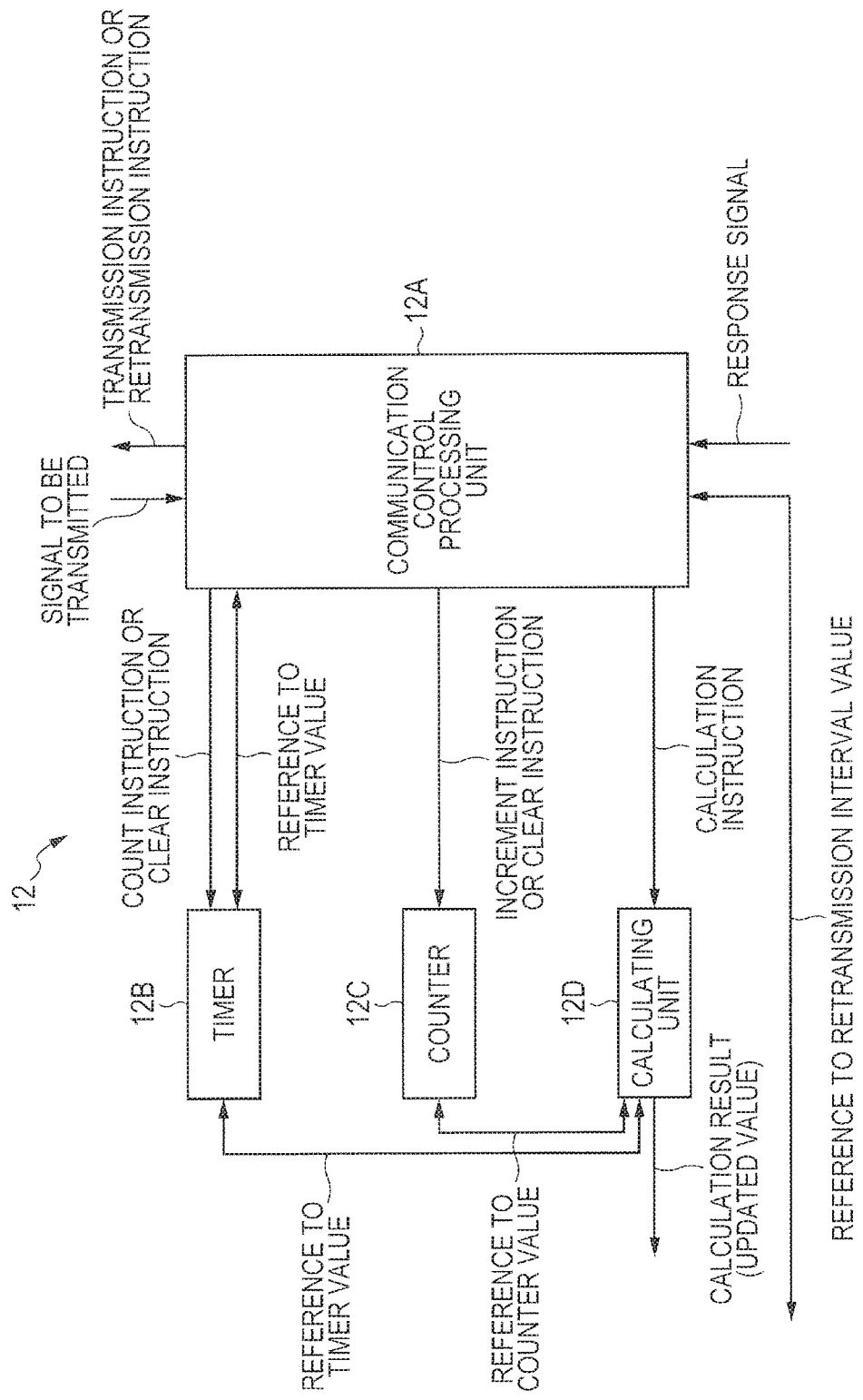
FIG. 2 is a block diagram showing an example of a communication control unit according to the first embodiment.

FIG. 2 is a block diagram showing an example of the communication control unit according to the first embodiment. In FIG. 2, the communication control unit 12 includes a communication control processing unit 12A, a timer 12B, a counter 12C, and a calculating unit 12D.

After receiving the signal to be transmitted and outputting a transmission instruction on the signal to the transmitting unit 11, the communication control processing unit 12A outputs a count instruction to the timer 12B. The timer 12B starts a time measurement in response to the count instruction. The timer 12B receives a clear instruction, which will be discussed later, and the count instruction from the communication control processing unit 12A so as to repeatedly measure a time corresponding to the set retransmission interval value.

Moreover, the communication control processing unit 12A refers to the timer value (i.e., a time measured value) of the timer 12B with a predetermined period and refers to the set retransmission interval value stored in the memory unit 14 with the predetermined period. Subsequently, when the time measured value of the timer 12B reaches the set retransmission interval value, the communication control processing unit 12A outputs the clear instruction to the timer 12B to reset the time measured value of the timer 12B. After that, the communication control processing unit 12A outputs the count instruction. At this point, the communication control processing unit 12A outputs an increment instruction to the counter 12C. In response to the increment instruction, the counter 12C increments a count value by one. In other words, the counter 12C counts the number of time intervals, each being counted by the timer 12B and corresponding to the set retransmission interval value.

When receiving the negative response signal from the receiving unit 13, the communication control processing unit 12A compares the time measured value of the timer 12B and the set retransmission interval value. Subsequently, the communication control processing unit 12A outputs the retransmission instruction to the transmitting unit 11 when the time measured value reaches the set retransmission interval value. Thus, the signal is retransmitted at a time interval corresponding to the set retransmission interval value.

When receiving the positive response signal from the receiving unit 13, the communication control processing unit 12A outputs a calculation instruction to the calculating unit 12D. The calculating unit 12D calculates "updated value" in response to the calculation instruction. Subsequently, the communication control processing unit 12A outputs the clear instruction to the timer 12B and the counter 12C at the end of reference to the timer 12B and the counter 12C by the calculating unit 12D.

The calculating unit 12D acquires the timer value of the timer 12B and the count value of the counter 12C when receiving the calculation instruction from the communication control processing unit 12A. The calculating unit 12D calculates "updated value" according to the acquired timer value and count value.

For example, the calculating unit 12D calculates an updated value according to the following equation (1):

Updated value=timer value+set retransmission interval value×count value    (1)

Subsequently, the calculating unit 12D outputs the calculated updated value to the updating unit 15.

<Configuration Example of the Reception Node>

As described above, the communication apparatus 20 operates as a reception node and thus the configuration of the communication apparatus 20 will be discussed below. In FIG. 1, the communication apparatus 20 includes a receiving unit 21, a control unit 22, and a transmitting unit 23.

The receiving unit 21 receives the signal transmitted from the communication apparatus 10 and outputs the received signal to the control unit 22.

The control unit 22 outputs, to the transmitting unit 23, the response signal corresponding to the received signal from the receiving unit 21. As described above, the response signal is a positive response signal or a negative response signal.

The transmitting unit 23 transmits the response signal received from the control unit 22, to the communication apparatus 10.

<Operation Example of the Communication System>

Figure 3:
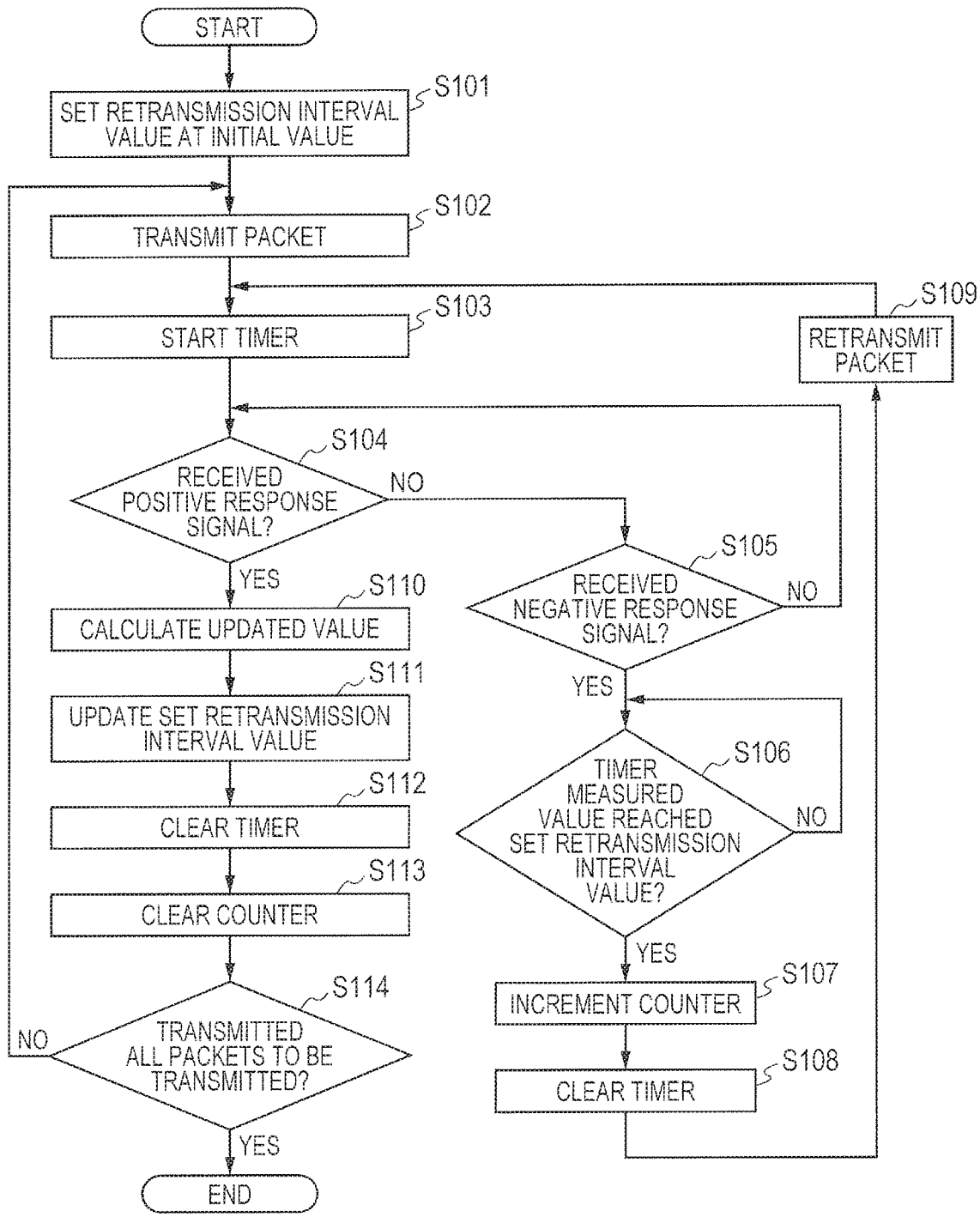
FIG. 3 is a flowchart showing an example of an operation of a transmission node according to the first embodiment.

An operation example of the communication system 1 configured thus according to the first embodiment will be described below. FIG. 3 is a flowchart showing an example of an operation of the transmission node according to the first embodiment. In this case, an example of the signal to be transmitted is a series of packets.

The communication control unit 12 stores the initial value of the retransmission interval value in the memory unit 14, allowing the setting of the initial value of the retransmission interval value (Step S101).

Subsequently, the communication control unit 12 outputs the transmission instruction to the transmitting unit 11 to transmit a packet (Step S102).

The communication control unit 12 then starts the timer 12B to start a time measurement (Step S103).

After that, the communication control unit 12 decides whether the positive response signal corresponding to the packet transmitted in step S102 has been received or not (Step S104). If the positive response signal has not been received (Step S104 NO), the communication control unit 12 decides whether the negative response signal has been received or not (Step S105). In other words, the decisions in step S104 and step S105 are repeated until the positive response signal or the negative response signal is received.

If the negative response signal is received (Step S105 YES), the communication control unit 12 decides whether the measured value of the timer 12B has reached the set retransmission interval value or not (Step S106). The decision in step S106 is repeated until the measured value of the timer 12B reaches the set retransmission interval value (Step S106 NO).

If the measured value of the timer 12B has reached the set retransmission interval value (Step S106 YES), the communication control unit 12 increments the count value of the counter 12C (Step S107) and clears the timer value of the timer 12B (Step S108). The communication control unit 12 then outputs the retransmission instruction to the transmitting unit 11 to retransmit the packet (Step S109). After that, the processing step returns to step S103.

If the positive response signal has been received (Step S104 YES), the communication control unit 12 calculates "updated value" (Step S110). Subsequently, the updating unit 15 updates the set retransmission interval value stored in the memory unit 14, according to "updated value" calculated by the communication control unit 12 (Step S111). The communication control unit 12 then clears the measured value of the timer 12B (Step S112) and clears the count value of the counter 12C (Step S113).

The processing steps from step S102 to step S113 are repeated until after the transmission of a series of packets to be transmitted (Step S114 NO). After the transmission of the series of packets to be transmitted (Step S114 YES), a processing flow in FIG. 3 is ended.

Figure 4:
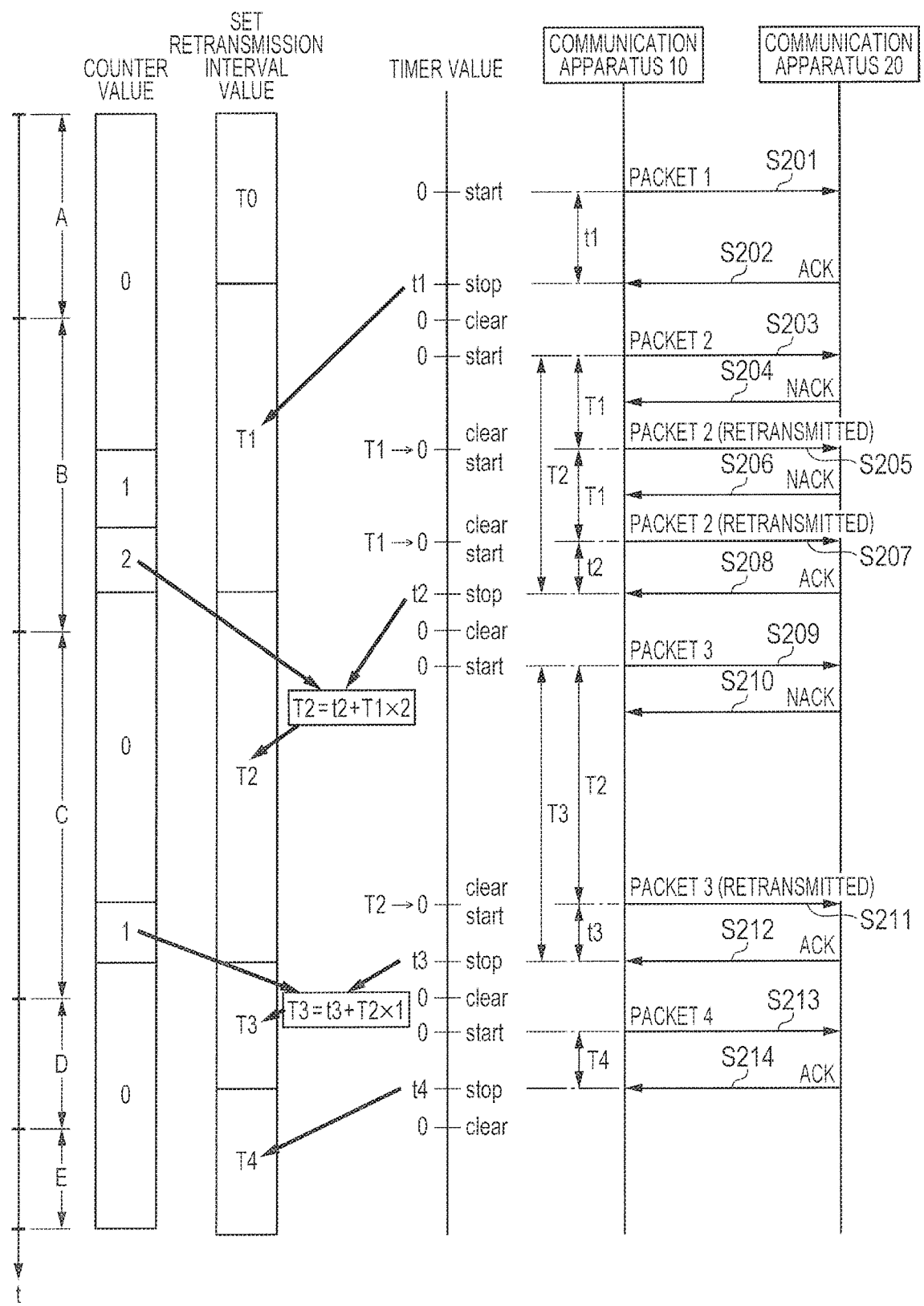
FIG. 4 is an explanatory drawing showing an operation example of the communication system according to the first embodiment.

A specific example of an update of the retransmission interval value will be described below. FIG. 4 is an explanatory drawing showing the operation example of the communication system according to the first embodiment.

In FIG. 4, a section A, a section B, a section C, and a section D indicate sections for correctly receiving a packet 1, a packet 2, a packet 3, and a packet 4 in the end by the communication apparatus 20. In the first section A, the set retransmission interval value is set at an initial value T0.

The communication apparatus 10 transmits the packet 1 to the communication apparatus 20 (Step S201). At this point, the measurement of the timer 12B is started. The communication apparatus 20 then transmits a positive response signal for the packet 1 (Step S202). When receiving the positive response signal, the communication apparatus 10 terminates the measurement of the timer 12B. At this point, the timer 12B has a measured value t1 that is used as a set retransmission interval value T1 of the subsequent section B.

The communication apparatus 10 has received the positive response signal for the packet 1 and thus transmits the subsequent packet 2 to the communication apparatus 20 (Step S203). At this point, the measurement of the timer 12B is started. The communication apparatus 20 then transmits the negative response signal corresponding to the packet 2 to the communication apparatus 10 (Step S204). When receiving the negative response signal, the communication apparatus 10 retransmits the packet 2. However, the packet 2 is retransmitted after a lapse of the set retransmission interval value T1 or more from the previous transmission of the packet 2. Thus, the communication apparatus 10 retransmits the packet 2 after a lapse of the set retransmission interval value T1 from the transmission of the packet 2 in step S203 (Step S205). At this point, the measured value of the timer 12B is cleared and then the timer 12B restarts a measurement; meanwhile, the count value of the counter 12C is incremented from "0" to "1". Subsequently, the communication apparatus 20 transmits, to the communication apparatus 10, the negative response signal corresponding to the packet 2 retransmitted in step S205 (Step S206). The communication apparatus 10 then retransmits the packet 2 for the second time after a lapse of the set retransmission interval value T1 from the first retransmission of the packet 2 (Step S207). At this point, the measured value of the timer 12B is cleared and then the timer 12B restarts a measurement; meanwhile, the count value of the counter 12C is further incremented from "1" to "2". Subsequently, the communication apparatus 20 transmits, to the communication apparatus 10, the positive response signal corresponding to the packet 2 retransmitted in step S207 (Step S208). When receiving the positive response signal, the communication apparatus 10 terminates the measurement of the timer 12B. At this point, the timer 12B has a measured value t2 and the count value is "2". Moreover, the current set retransmission interval value is "T1". These values are substituted in Equation (1), thereby calculating a set retransmission interval value "T2" in the section C. The communication apparatus 10 then clears the count value of the counter 12C.

The communication apparatus 10 has received the positive response signal for the packet 2 and thus transmits the subsequent packet 3 to the communication apparatus 20 (Step S209). At this point, the measurement of the timer 12B is started. The communication apparatus 20 then transmits the negative response signal corresponding to the packet 3 to the communication apparatus 10 (Step S210). The communication apparatus 10 retransmits the packet 3 after a lapse of the set retransmission interval value T2 from the transmission of the packet 3 (Step S211). At this point, the measured value of the timer 12B is cleared and then the timer 12B restarts a measurement; meanwhile, the count value of the counter 12C is incremented from "0" to "1". Subsequently, the communication apparatus 20 transmits, to the communication apparatus 10, the positive response signal corresponding to the packet 3 retransmitted in step S211 (Step S212). When receiving the positive response signal, the communication apparatus 10 terminates the measurement of the timer 12B. At this point, the timer 12B has a measured value t3 and the count value is "1". Moreover, the current set retransmission interval value is "T2". These values are substituted in Equation (1), thereby calculating a set retransmission interval value "T3" in the section D. The communication apparatus 10 then clears the count value of the counter 12C.

The communication apparatus 10 has received the positive response signal for the packet 3 and thus transmits the subsequent packet 4 to the communication apparatus 20 (Step S213). At this point, the measurement of the timer 12B is started. The communication apparatus 20 then transmits the positive response signal corresponding to the packet 4 to the communication apparatus 10 in the first transmission (Step S214). When receiving the positive response signal, the communication apparatus 10 terminates the measurement of the timer 12B. At this point, the timer 12B has a measured value t4 and the count value is "0". Moreover, the current set retransmission interval value is "T3". These values are substituted in Equation (1), thereby calculating a set retransmission interval value "T4" in the section E where the subsequent packet of the packet 3 is transmitted.

As described above, in the communication apparatus 10 serving as a transmission node of the first embodiment, the communication control unit 12 transmits the first signal and receives the response signal corresponding to the first signal from the receiver (in this case, the communication apparatus 20). If the received response signal is a negative response signal, the first signal is retransmitted at a time interval longer than or equal to the retransmission interval value, which is stored in the memory unit 14, after the transmission of the first signal. Subsequently, the updating unit 15 updates the retransmission interval value, which is stored in the memory unit 14, based on a time from the transmission of the first signal to the reception of the positive response signal corresponding to the first signal.

According to the configuration of the communication apparatus 10 serving as a transmission node, the second signal to be transmitted after the first signal can be retransmitted according to the retransmission interval value adjusted based on the actual transmission time of the first signal. In other words, the signal can be retransmitted according to a more suitable retransmission interval value for communication environments such as the traffic of the transmission line P1 and the communication capacity of the receiver. This can prevent transmission efficiency from being reduced by repeatedly retransmitting the same signal so as to occupy the band of the transmission line P1. In other words, the signal can be transmitted with higher efficiency.

According to the configuration of the communication apparatus 10, if the positive response signal can be received in the first transmission without the need for retransmission, the retransmission interval value can be adjusted to a smaller value.

Furthermore, the retransmission interval value can be adjusted by the communication apparatus 10 alone without being determined between the communication apparatus 10 serving as a transmission node and the communication apparatus 20 serving as a reception node. Thus, the communication apparatus 10 is applicable to various systems. In other words, the communication apparatus 10 is highly versatile.

If the positive response signal corresponding to the first signal is received, the communication control unit 12 transmits the second signal to the receiver (in this case, the communication apparatus 20) subsequently to the first signal after the predetermined time from the reception of the positive response signal.

The configuration of the communication apparatus 10 can also prevent a reduction in transmission efficiency. Specifically, it is assumed that the negative response signal is repeated in a certain period during the transmission of a series of signals to be transmitted. In this case, "signal transmission interval" adjusted as in Japanese Unexamined Patent Application Publication No. 2004-260562 may cause transmission of the series of signals at an excessively long signal transmission interval even after the positive response signal is repeated. The signal transmission interval is "an interval from the previous ACK signal transmission (retransmission) to the current transmission of a signal to be transmitted, regarding a series of signals to be transmitted." In the communication apparatus 10, the retransmission interval value is updated but "signal transmission interval" is not adjusted, thereby preventing a reduction in transmission efficiency.

<Another Application Example>

In the above explanation, the signal to be transmitted is a packet, the positive response signal is an ACK signal, and the negative response signal is a NACK signal. The present invention is not limited to this application. For example, the communication system 1 may be applied to a USB-compliant system (Universal Serial Bus). Specifically, the technique may be applied to the transmission of a transition request (i.e., a control signal) to a low-power consumption state that is defined by the USB 3.1 standard. The USB 3.1 standard will be described below. The USB 3.1 standard allows a transition from a normal state "U0" to a low-power consumption state "U1/U2". In this case, the signal to be transmitted is, for example, a low-power consumption state transition request (LGO_U1/LGO_U2), the positive response signal is an ACK signal (LAU), and the negative response signal is a NACK signal (LXU). Unlike in the foregoing explanation, the communication apparatus having received LAU transmits an ACK response (LPMA) to the communication apparatus having transmitted LAU, which is specific to the USB standard.

Figure 5:
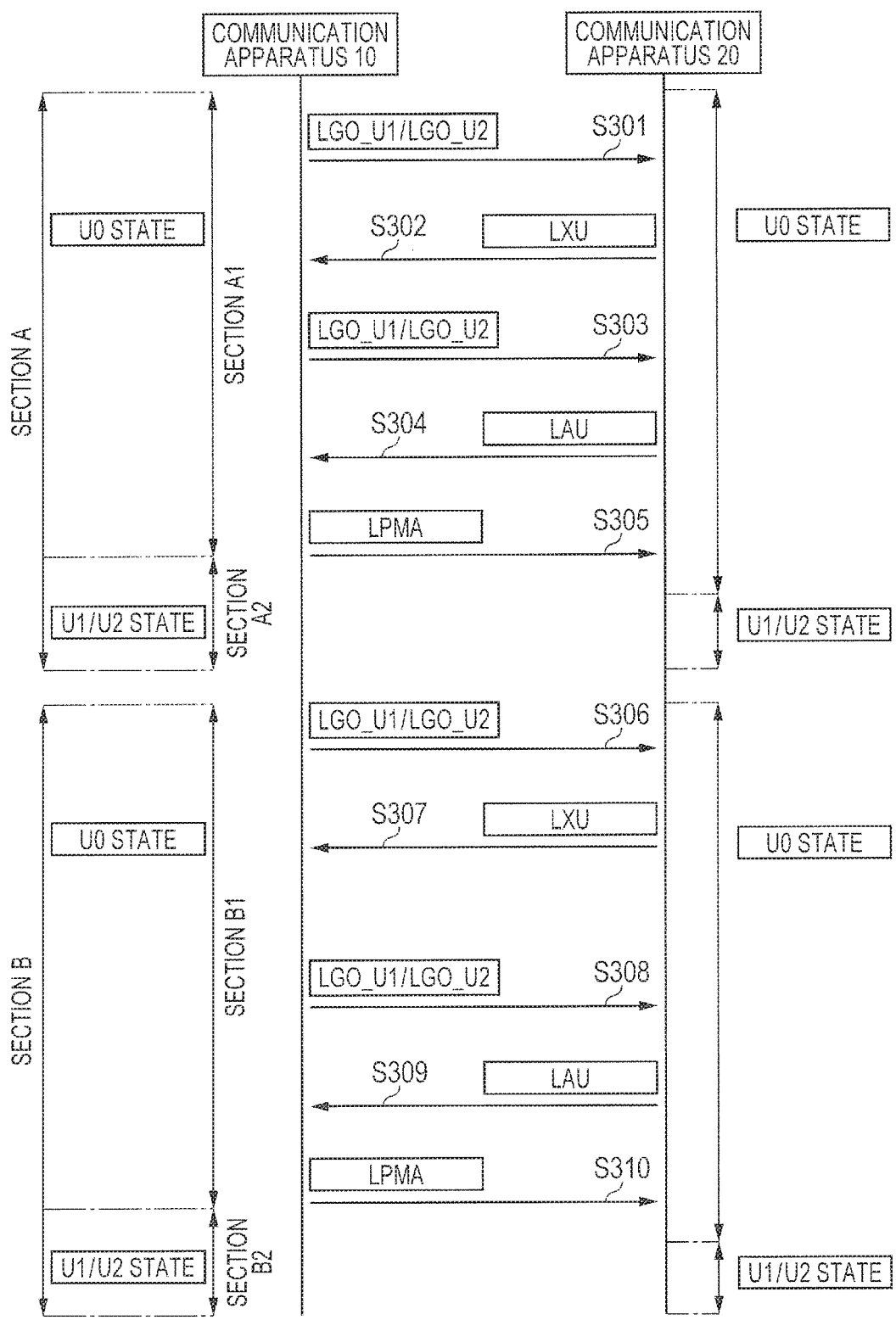
FIG. 5 is an explanatory drawing showing another application example of the communication system according to the first embodiment.

FIG. 5 is an explanatory drawing showing another application example of the communication system according to the first embodiment. In FIG. 5, for example, one of the communication apparatus 10 and the communication apparatus 20 is a host, whereas the other is a device. Moreover, in FIG. 5, a section A is a section (sequence) where the communication apparatus 10 changed a state used for communications with the communication apparatus 20, and a section B is a section (sequence) where the communication apparatus 10 changed a state used for communications with the communication apparatus 20 at another opportunity after the section A. For example, in the section A, the communication apparatus 10 and the communication apparatus 20 are coupled to transmit a low-power consumption state transition request (LGO_U1/LGO_U2) for the first time and the retransmission interval value approaches closest to an optimal value.

At the beginning of the section A, the power consumption states of the communication apparatus 10 and the communication apparatus 20 are both designated as a U0 state. The communication apparatus 10 transmits the low-power consumption state transition request (LGO_U1/LGO_U2) to the communication apparatus 20 (Step S301). At this point, the measurement of the timer 12B is started.

In this step, the communication apparatus 20 having received the low-power consumption state transition request transmits the NACK signal (LXU) (Step S302).

When receiving the NACK signal (LXU) from the communication apparatus 20, the communication apparatus 10 retransmits the low-power consumption state transition request after a lapse of the set retransmission interval value from the transmission of the low-power consumption state transition request in step S301 (Step S303). At this point, the measured value of the timer 12B is cleared and then the timer 12B restarts a measurement; meanwhile, the count value of the counter 12C is further incremented.

The communication apparatus 20 having received the retransmitted low-power consumption state transition request transmits the ACK signal (LAU) to the communication apparatus 10 (Step S304).

When receiving the ACK signal (LAU) from the communication apparatus 20, the communication apparatus 10 acquires the measured value of the timer 12B at this point and then terminates the measurement of the timer 12B. Moreover, the communication apparatus 10 acquires the count value of the counter 12C at this point. Furthermore, the communication apparatus 10 acquires the set retransmission interval value at this point. In this case, the communication apparatus 10 and the communication apparatus 20 are coupled to transmit the low-power consumption state transition request (LGO_U1/LGO_U2) for the first time in the section A and thus the acquired set retransmission interval value is equal to the initial value. The communication apparatus 10 substitutes these values in Equation (1) to calculate an updated value and then updates the set retransmission interval value according to the calculated updated value.

The communication apparatus 10 then transmits the ACK response (LPMA) to the communication apparatus 20 (Step S305) and the communication apparatus 20 receives the ACK response (LPMA). This changes the power consumption states of the communication apparatus 10 and the communication apparatus 20 to a state indicated by the low-power consumption state transition request.

From step S306 to step S310 of the section B, the same processing is performed as in step S301 to step S305. In this case, a time interval between the transmission of the low-power consumption state transition request in step S306 and the retransmission of the low-power consumption state transition request in step S308 is longer than or equal to the retransmission interval value updated in the section A.

If the flowchart of FIG. 3 is applied to the transmission node of the communication system 1 compliant with the USB (Universal Serial Bus) standard, the need for processing in step S114 is eliminated and the step of transmitting the ACK response (LPMA) is added instead. This flowchart is implemented in each section (e.g., in the sections A and B). In the first section (e.g., the section A), the retransmission interval value is set at the initial value in step S101. In the subsequent section (e.g., the section B), the retransmission interval value updated in the previous section (e.g., the section A) in step S101 is used.

Second Embodiment

In a second embodiment, if a transmission node receives a negative response signal at least N times (N is a natural number of at least 2) consecutively from a reception node, each time the negative response signal is received in the at least N times, a set retransmission interval value is updated by a value obtained by adding a predetermined additional value to the set retransmission interval value. A communication apparatus serving as the reception node of the second embodiment is identical to the communication apparatus 20 serving as the reception node of the first embodiment, and thus the explanation thereof is omitted. Moreover, the basic configuration of a communication apparatus serving as the transmission node of the second embodiment is identical to the communication apparatus 10 serving as the transmission node of the first embodiment, and thus the basic configuration will be discussed in accordance with FIG. 1.

<The Configuration of the Transmission Node>

Figure 6:
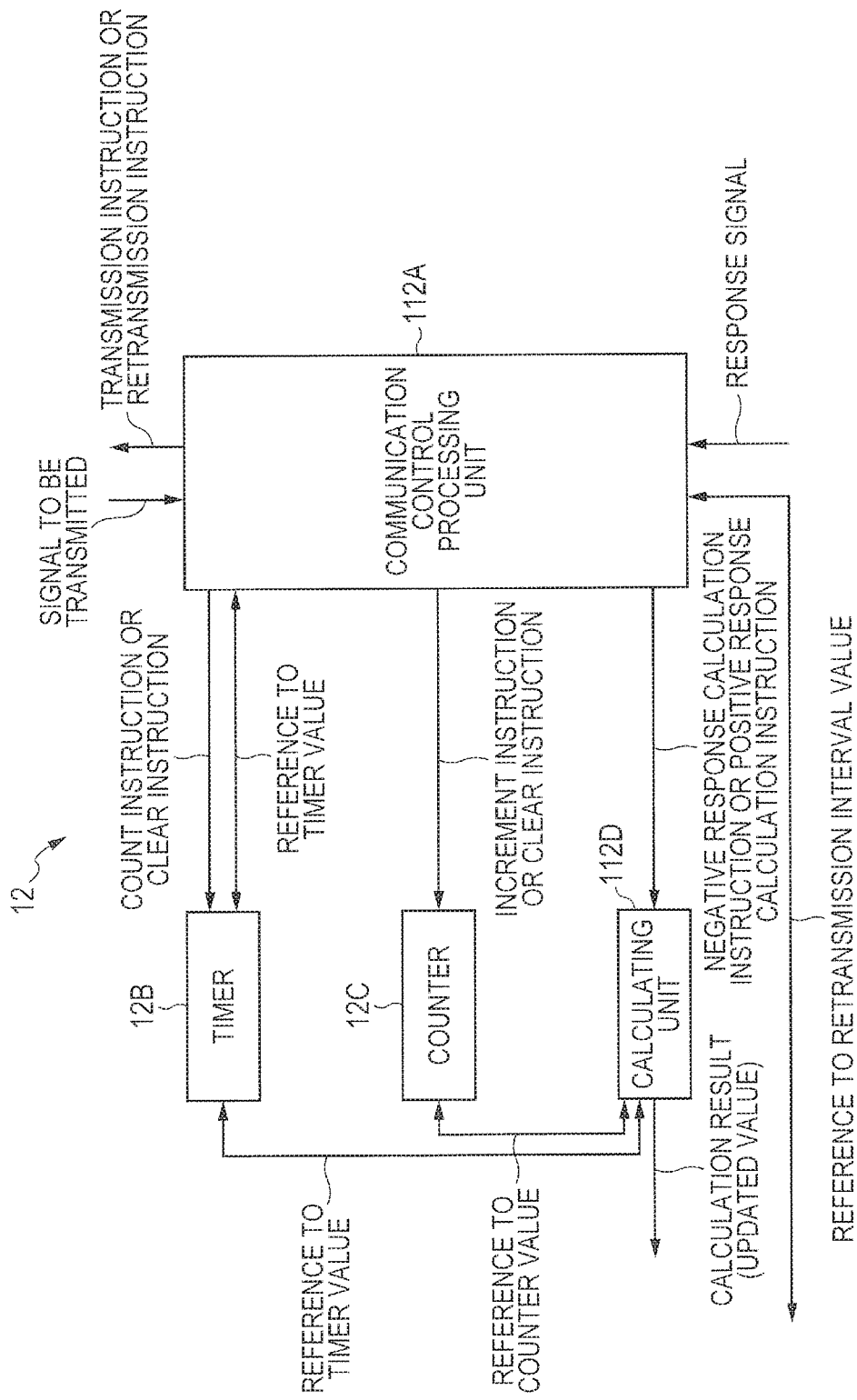
FIG. 6 is a block diagram showing an example of the communication control unit of a transmission node according to a second embodiment.

FIG. 6 is a block diagram showing an example of the communication control unit of the transmission node according to the second embodiment. In FIG. 6, a communication control unit 12 in a communication apparatus 10 serving as the transmission node of the second embodiment includes a communication control processing unit 112A and a calculating unit 112D.

When receiving a positive response signal from a receiving unit 13, the communication control processing unit 112A outputs "positive response calculation instruction" to the calculating unit 112D. The calculating unit 112D calculates "updated value" in response to "positive response calculation instruction".

When receiving the negative response signal from a receiving unit 13, like the communication control processing unit 12A of the first embodiment, the communication control processing unit 112A performs processing for retransmission, clearing of a counter 12C, and clearing and starting of a timer 12B. When receiving the negative response signal from the receiving unit 13, the communication control processing unit 112A further outputs "negative response calculation instruction" to the calculating unit 112D. The calculating unit 112D calculates "updated value" in response to "negative response calculation instruction."

When receiving the positive response calculation instruction from the communication control processing unit 112A, the calculating unit 112D acquires the timer value of the timer 12B and the count value of the counter 12C at the time of reception and calculates "updated value" according to the acquired timer value and count value. An updating unit 15 updates the set retransmission interval value according to the calculated updated value.

For example, when receiving the positive response calculation instruction, the calculating unit 112D calculates "updated value" according to the following equation (2):

$$\text{Updated value} = \text{timer value} + \text{set retransmission interval value} \times \text{count value} - \text{predetermined subtraction value } \alpha \quad (2)$$

When receiving the negative response calculation instruction from the communication control processing unit 112A, the calculating unit 112D acquires the set retransmission interval value with reference to a memory unit 14 and adds a predetermined additional value $\beta$ to the set retransmission interval value, thereby calculating "updated value. In other words, when receiving the negative response calculation instruction from the communication control processing unit 112A, the calculating unit 112D calculates "updated value" according to the following equation (3):

$$\text{Updated value} = \text{set retransmission interval value} + \text{predetermined additional value } \beta \quad (3)$$

In this case, the calculating unit 112D may calculate "updated value" upon the reception of the negative response calculation instruction if it is decided that the count value acquired from the counter 12C is at least N (N is a natural number of at least 2). If the count value is smaller than N, the calculating unit 112D may not calculate "updated value".

The predetermined subtraction value $\alpha$ and the predetermined additional value $\beta$ may be stored in the memory (not shown) of the calculating unit 112D or in the memory unit 14.

<Operation Example of the Transmission Node>

Figure 7:
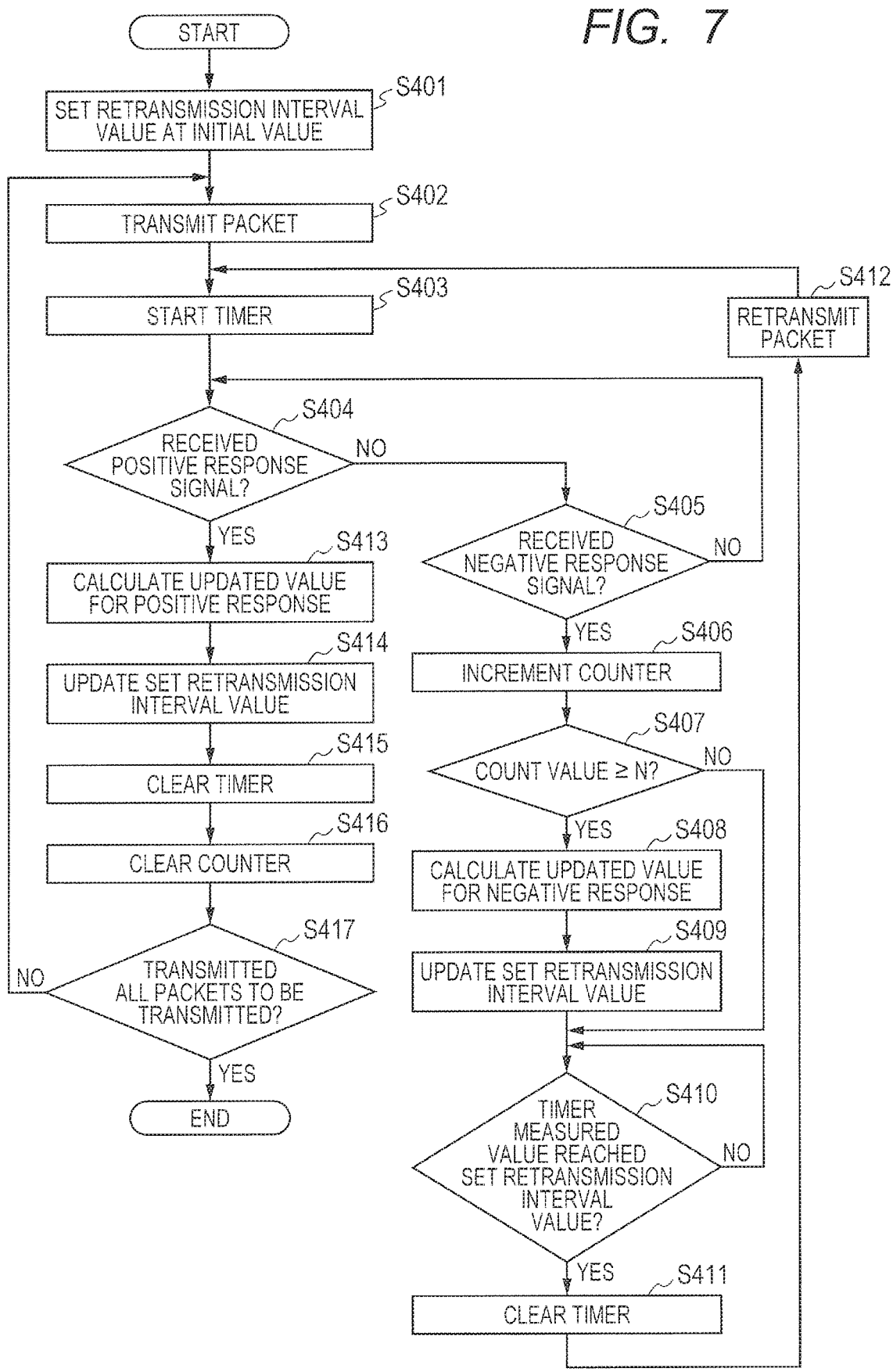
FIG. 7 is a flowchart showing an example of the operations the transmission node according to the second embodiment.

The operations of the communication apparatus 10 configured thus will be described below, the communication apparatus 10 serving as the transmission node of the second embodiment. FIG. 7 is a flowchart showing an example of the operations the transmission node according to the second embodiment.

The communication control unit 12 in the communication apparatus 10 serving as the transmission node of the second embodiment performs the same processing insteps S401 to S405 as in steps S101 to S105 shown in FIG. 3.

If the negative response signal is received (Step S405 YES), the communication control unit 12 of the second embodiment increments the count value of the counter 12C (Step S406).

Subsequently, the communication control unit 12 of the second embodiment decides whether the count value of the counter 12C is at least N (N is a natural number of at least 2) or not (Step S407). If the count value is at least N (Step S407 YES), an updated value upon the negative response is calculated according to equation (3) (Step S408).

After that, the updating unit 15 updates the set retransmission interval value stored in the memory unit 14, according to "updated value" calculated by the communication control unit 12 (Step S409). If the count value of the counter 12C is smaller than N (Step S407 NO), steps S408 and S409 are skipped and then the processing step advances to step S410.

Subsequently, the communication control unit 12 of the second embodiment decides whether the measured value of the timer 12B has reached the set retransmission interval value or not (Step S410). The decision in step S410 is repeated until the measured value of the timer 12B reaches the set retransmission interval value (Step S410 NO).

If the measured value of the timer 12B has reached the set retransmission interval value (Step S410 YES), the communication control unit 12 of the second embodiment clears the timer value of the timer 12B (Step S411). After that, the communication control unit 12 of the second embodiment outputs a retransmission instruction to a transmitting unit 11 to retransmit a packet (Step S412). The processing step then returns to step S403.

When receiving the positive response signal (Step S404 YES), the communication control unit 12 of the second embodiment calculates an updated value upon the positive response according to, for example, equation (2) (Step S413). Subsequently, the updating unit 15 updates the set retransmission interval value stored in the memory unit 14, according to the updated value calculated by the communication control unit 12 (Step S414). The communication control unit 12 of the second embodiment then clears the measured value of the timer 12B (Step S415) and the count value of the counter 12C (Step S416).

The processing steps from S402 to S416 are repeated until a series of packets has been completely transmitted (Step S417 NO). When the series of packets to be transmitted has been completely transmitted (Step S417 YES), the processing flow in FIG. 7 is ended.

As described above, in the communication apparatus 10 serving as the transmission node of the second embodiment, if the communication control unit 12 receives the negative response signal at least N times (N is a natural number of at least 2) consecutively, each time the negative response signal is received in the at least N times, the updating unit 15 updates the set retransmission interval value according to a value obtained by adding the predetermined additional value $\beta$ to the set retransmission interval value.

The configuration of the communication apparatus 10 sets the predetermined additional value $\beta$ at a proper value, thereby preventing the set retransmission interval value from excessively increasing even during repeated retransmission. Moreover, a fine adjustment can be continued using the predetermined additional value $\beta$, thereby setting the retransmission interval value at a more proper value. In this case, N is a natural number of at least 2 but is not particularly limited. Thus, N may be 1.

In the communication apparatus 10 of the second embodiment, if the communication control unit 12 receives the positive response signal, the calculating unit 112D calculates a time from the transmission of a first signal to the reception of the positive response signal corresponding to the first signal, and then the calculating unit 112D calculates an updated value by subtracting the predetermined subtraction value α from the calculated time. The updating unit 15 then updates the set retransmission interval value according to the updated value.

According to the configuration of the communication apparatus 10, even if an excessively large value is calculated as an updated value upon a negative response, the updated value can be corrected to a proper value. If the positive response signal is repeated, a smaller updated value is calculated upon a positive response, thereby setting the retransmission interval value for a proper communication environment.

<Another Application Example>

In the above explanation, the signal to be transmitted is a packet, the positive response signal is an ACK signal, and the negative response signal is a NACK signal. The present invention is not limited to this application example. As in <Another application example> of the first embodiment, a communication system 1 of the second embodiment may be applied to a USB-compliant system (Universal Serial Bus).

If the flowchart of FIG. 7 is applied to the transmission node of the communication system 1 compliant with the USB (Universal Serial Bus) standard, the need for processing in step S417 is eliminated and the step of transmitting the ACK response (LPMA) is added instead. This flowchart is implemented in each section. In the first section, the retransmission interval value is set at an initial value in step S401. In the subsequent section, the retransmission interval value updated in the previous section in step S401 is used.

Third Embodiment

A third embodiment relates to a USB-compliant system (Universal Serial Bus).

As described in <Another application example> of the first embodiment, if the signal to be transmitted according to the first embodiment is a packet, control on a retransmission interval is also applicable to a USB-compliant system (Universal Serial Bus) substantially as it is. However, the USB-compliant system (Universal Serial Bus) may have a unique signal transmission status. Thus, in the third embodiment, retransmission interval control will be described in consideration of a signal transmission status specific to a USB-compliant system (Universal Serial Bus).

A communication apparatus serving as the reception node of the third embodiment is identical to the communication apparatus 20 serving as the reception node of the first embodiment and thus the explanation thereof is omitted. Moreover, the basic configuration of a communication apparatus serving as the transmission node of the third embodiment is identical to that of the communication apparatus 10 serving as the transmission node of the first embodiment and thus the basic configuration will be discussed with reference to FIG. 1.

<The Configuration of the Transmission Node>

Figure 8:
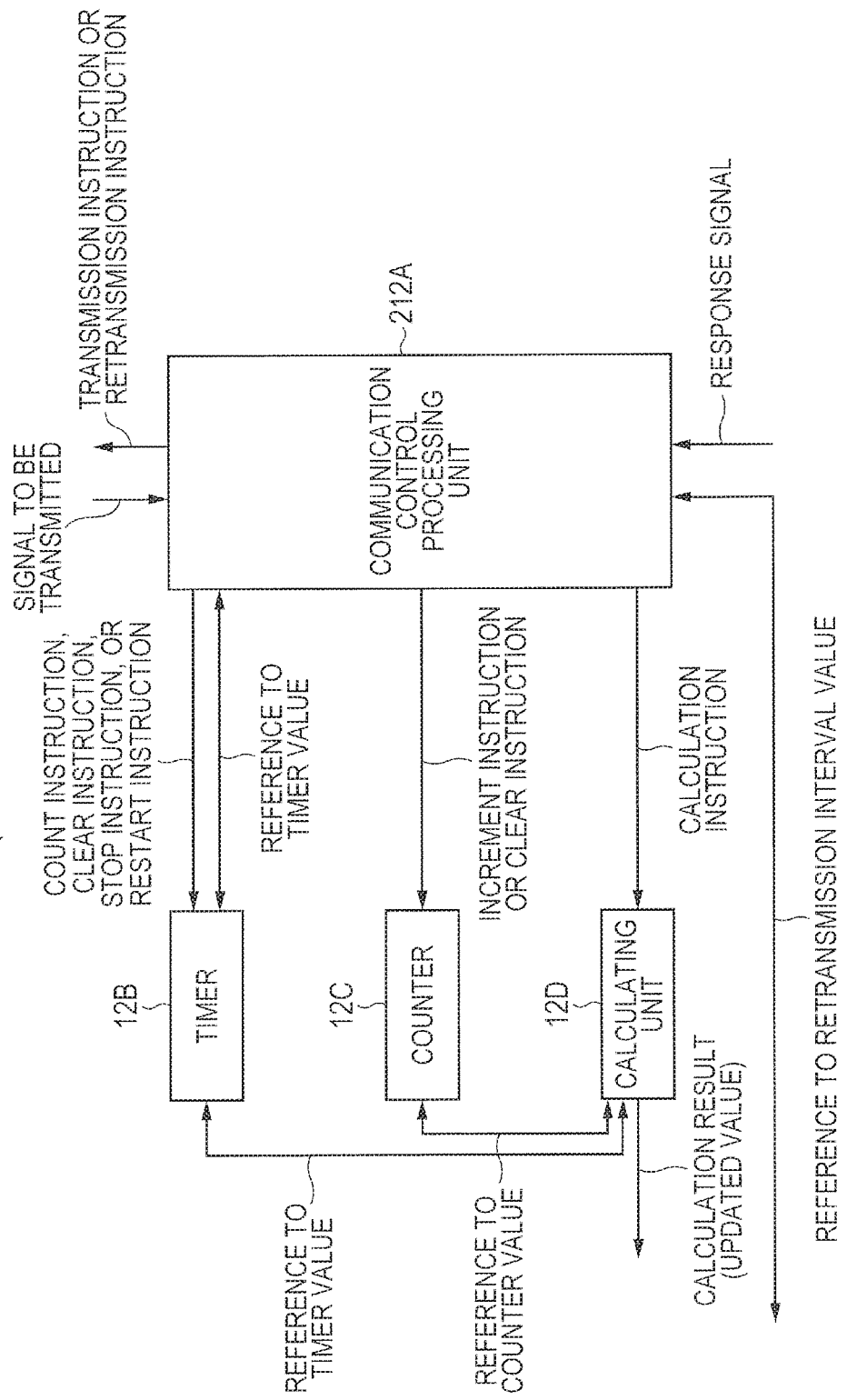
FIG. 8 is a block diagram showing an example of the communication control unit of a transmission node according to a third embodiment.

FIG. 8 is a block diagram showing an example of the communication control unit of the transmission node according to the third embodiment. In FIG. 8, a communication control unit 12 in a communication apparatus 10 serving as the transmission node of the third embodiment includes a communication control processing unit 212A.

The communication control processing unit 212A outputs "stop instruction" to a timer 12B if it is decided that "USB data packet transmission condition (hereinafter will be simply referred to as "transmission condition")" is satisfied. When receiving the stop instruction, the timer 12B temporarily stops a time measurement.

The communication control processing unit 212A outputs "restart instruction" to the timer 12B if it is decided that "USB data packet transmission completion condition (hereinafter will be simply referred to as "transmission completion condition")" is satisfied. When receiving the restart instruction, the timer 12B restarts the temporarily stopped time measurement.

"USB data packet transmission condition" indicates that a USB data packet needs to be transferred or is being transferred. "USB data packet transmission completion condition" indicates that the transfer of a USB data packet is completed.

When "transmission condition" is satisfied, the communication control processing unit 212A temporarily stops the time measurement of the timer 12B, whereas when "transmission completion condition" is satisfied, the communication control processing unit 212A restarts the time measurement of the timer 12B. This can subtract a time during which the transmission of a USB data packet prevents retransmission of a low-power consumption state transition request (LGO_U1/LGO_U2) (that is, the retransmission of a transition request is held on standby), from the updated value of a retransmission interval value calculated by a calculating unit 12D.

<Operation Example of the Transmission Node>

Figure 9:
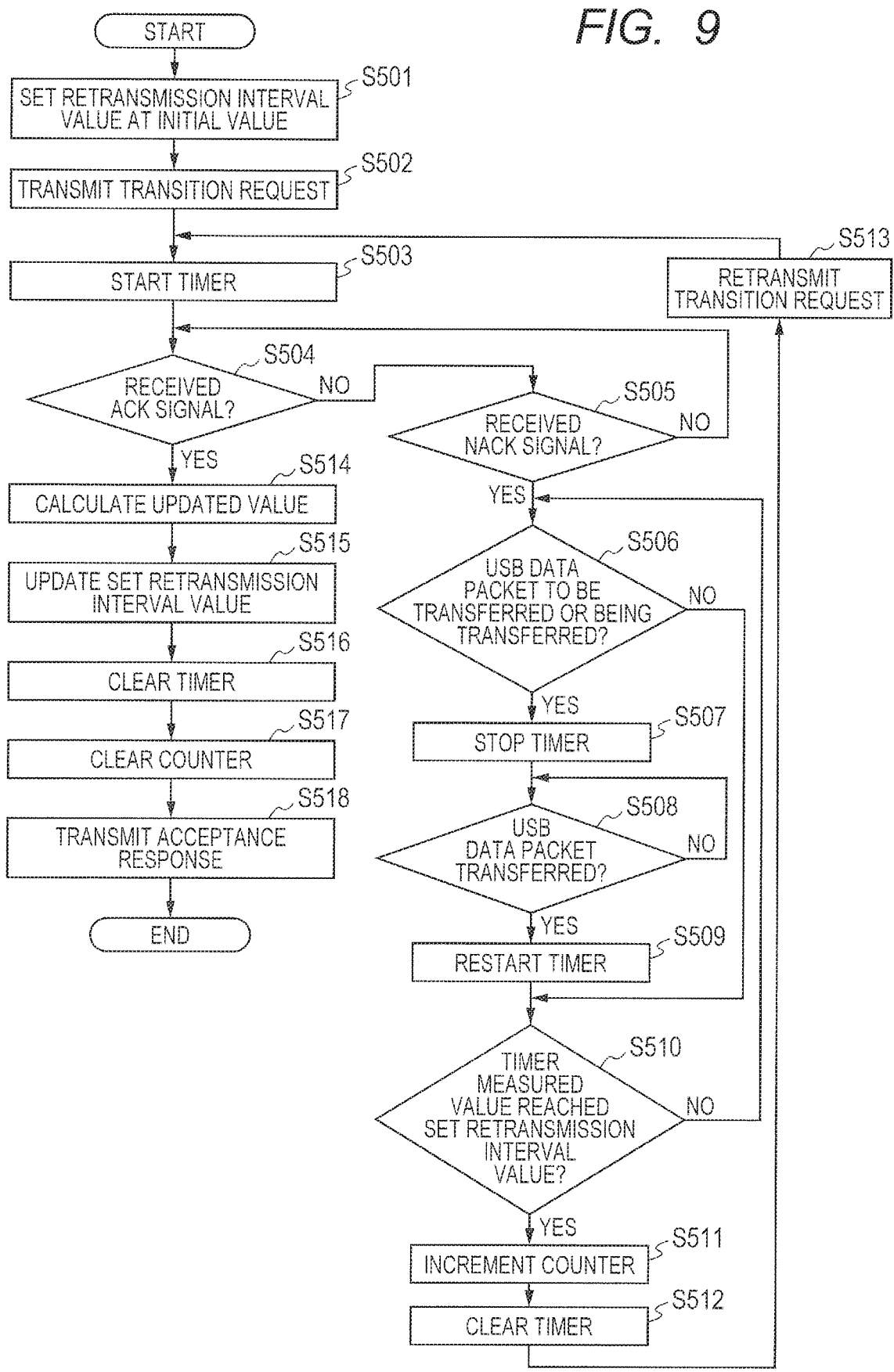
FIG. 9 is a flowchart showing an example of the operations the transmission node according to the third embodiment.

The operations of the communication apparatus 10 configured thus will be describe below, the communication apparatus 10 serving as the transmission node of the third embodiment. FIG. 9 is a flowchart showing an example of the operations of the transmission node according to the third embodiment.

The communication control unit 12 in the communication apparatus 10 serving as the transmission node of the third embodiment performs the same processing insteps S501 to S505 as in steps S101 to S105 shown in FIG. 3. A signal to be transmitted is a low-power consumption state transition request (LGO_U1/LGO_U2), a positive response signal is an ACK signal (LAU), and a negative response signal is a NACK signal (LXU).

If the negative response signal is received (Step S505 YES), the communication control unit 12 of the third embodiment decides whether "transmission condition" is satisfied or not, that is, whether a USB data packet needs to be transferred or is being transferred (Step S506).

If "transmission condition" is satisfied (Step S506 YES), the communication control unit 12 of the third embodiment stops the time measurement of the timer 12B (Step S507).

Subsequently, the communication control unit 12 of the third embodiment decides whether "transmission completion condition" is satisfied or not (Step S508). The decision is repeated until "transmission completion condition" is satisfied (Step S508 NO).

If "transmission completion condition" is satisfied (Step S508 YES), the communication control unit 12 of the third embodiment restarts the time measurement of the timer 12B (Step S509). The processing step then advances to step S510. If "transmission condition" is not satisfied (Step S506 NO), steps S507 to S509 are skipped and then the processing step advances to step S510.

Processing in steps S510 to S513 is identical to that of steps S106 to S109 in FIG. 3. If it is decided in step S510 that the measured value of the timer has not reached the set retransmission interval value (Step S510 NO), the processing step returns to step S506. Moreover, the low-power consumption state transition request (LGO_U1/LGO_U2) is to be retransmitted in step S513. Processing in steps S514 to S517 is identical to that of steps S110 to S113 in FIG. 3.

In this case, the communication control unit 12 of the third embodiment transmits an ACK response (LPMA), which is specific to the USB standard (Step S518).

The flowchart of FIG. 9 is implemented in each section (e.g., sections C and D). In the first section (e.g., the section C, which will be discussed later), the retransmission interval value is set at an initial value in step S501. In the subsequent section (e.g., the section D, which will be discussed later), the retransmission interval value updated in the previous section (e.g., the section C, which will be discussed later) in step S501 is used.

Figure 10:
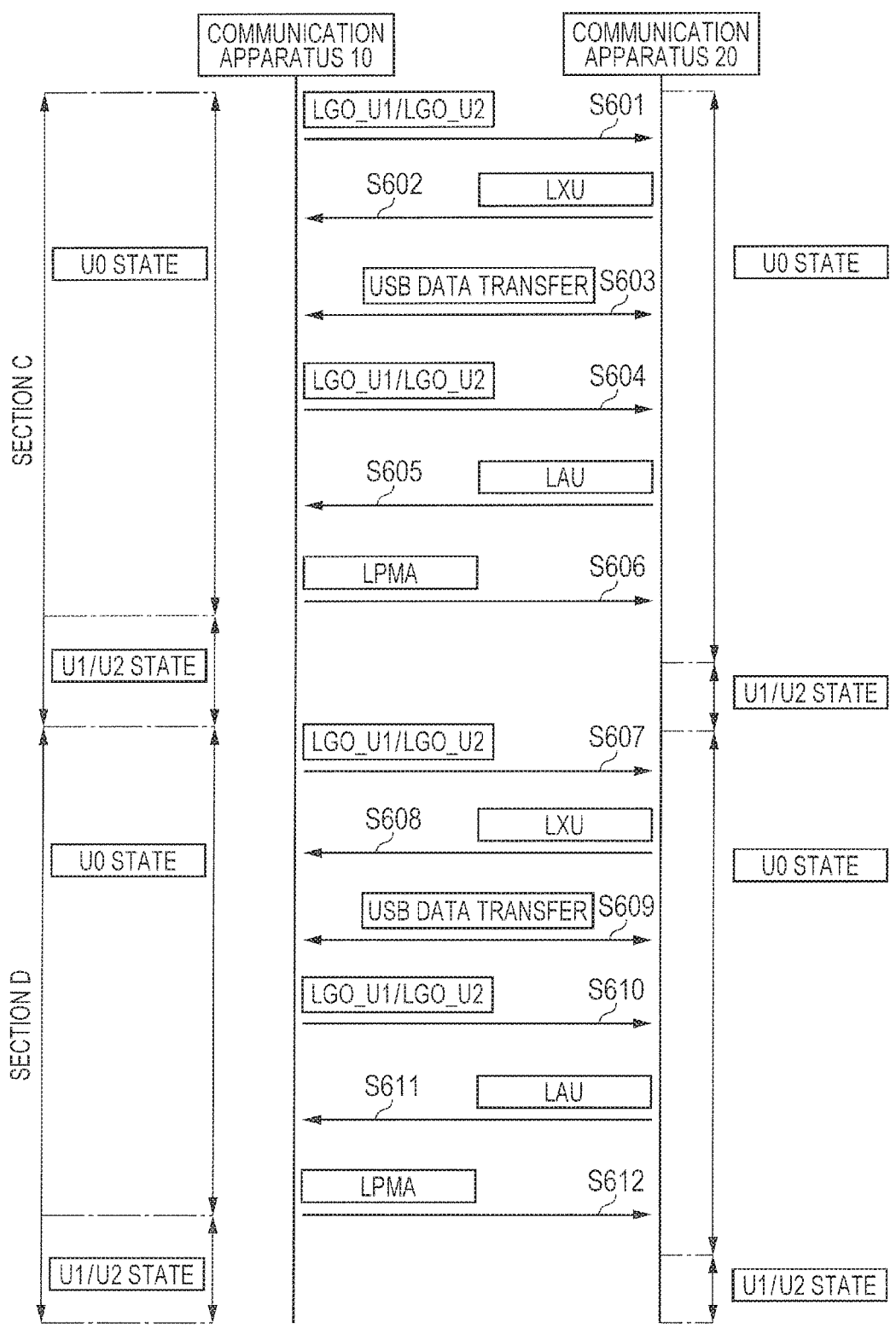
FIG. 10 is a sequence showing an example of the operations of a communication system according to the third embodiment.

FIG. 10 is a sequence showing an example of the operations of the communication system according to the third embodiment. In FIG. 10, for example, one of the communication apparatus 10 and the communication apparatus 20 is a host, whereas the other is a device. Moreover, in FIG. 10, the section C is a section (sequence) where the communication apparatus 10 changed a state used for communications with the communication apparatus 20, and the section D is a section (sequence) where the communication apparatus 10 changed a state used for communications with the communication apparatus 20 at another opportunity after the section C. For example, in the section C, the communication apparatus 10 and the communication apparatus 20 are coupled to transmit a low-power consumption state transition request (LGO_U1/LGO_U2) for the first time and the retransmission interval value approaches closest to an optimal value.

At the beginning of the section C, the power consumption states of the communication apparatus 10 and the communication apparatus 20 are both designated as a U0 state. The communication apparatus 10 transmits the low-power consumption state transition request (LGO_U1/LGO_U2) to the communication apparatus 20 (Step S601). At this point, the measurement of the timer 12B is started.

In this case, the communication apparatus 20 having received the low-power consumption state transition request transmits the NACK signal (LXU) (Step S602).

Subsequently, the transmission of USB data packets is started between the communication apparatus 10 and the communication apparatus 20 (Step S603). At this point, as described above, the time measurement of the timer 12B is temporarily stopped during the transmission of USB data packets. At the completion of the transmission of USB data packets in step S603, the time measurement of the timer 12B is restarted.

At the completion of the transmission of USB data packets, the communication apparatus 10 retransmits the low-power consumption state transition request after a lapse of the set retransmission interval value from the transmission of the low-power consumption state transition request in step S301 (Step S604). At this point, the measured value of the timer 12B is cleared and then the timer 12B restarts a measurement; meanwhile, the count value of the counter 12C is further incremented.

The communication apparatus 20 having received the retransmitted low-power consumption state transition request transmits the ACK signal (LAU) to the communication apparatus 10 (Step S605).

When receiving the ACK signal (LAU) from the communication apparatus 20, the communication apparatus 10 acquires the measured value of the timer 12B at this point and then terminates the measurement of the timer 12B. Moreover, the communication apparatus 10 acquires the count value of the counter 12C and the set retransmission interval value at this point. In this case, the communication apparatus 10 and the communication apparatus 20 are coupled to transmit the low-power consumption state transition request (LGO_U1/LGO_U2) for the first time in the section C and thus the acquired set retransmission interval value is equal to the initial value. The communication apparatus 10 substitutes these values in Equation (1) to calculate an updated value and then updates the set retransmission interval value according to the calculated updated value.

The communication apparatus 10 then transmits the ACK response (LPMA) to the communication apparatus 20 (Step S606) and the communication apparatus 20 receives the ACK response (LPMA). This changes the power consumption states of the communication apparatus 10 and the communication apparatus 20 to a state indicated by the low-power consumption state transition request.

In steps S607 to S612 of the section D, the same processing is performed as in steps S601 to S606. In this case, a time interval between the transmission of the transition request in step S607 and the retransmission of the transition request in step S610 is longer than or equal to the retransmission interval value updated in the section C.

As described above, the low-power consumption state transition request (LGO_U1/LGO_U2) is transmitted between the transmission periods of USB data packets. In this case, when the NACK signal (LXU) is returned in response to the low-power consumption state transition request (LGO_U1/LGO_U2), whether to retransmit the low-power consumption state transition request (LGO_U1/LGO_U2) is decided depending on the necessity for the transmission of USB data packets. If USB data packets need to be transmitted, the low-power consumption state transition request (LGO_U1/LGO_U2) is retransmitted after the completion of the transmission of USB data packets. If USB data packets are transmitted between the retransmission flows of the low-power consumption state transition request (LGO_U1/LGO_U2), a continuous time measurement of the timer 12B may lead to calculation of an excessively large retransmission interval value. Thus, the timer 12B is stopped during the transmission of USB data packets.

As described above, according to the third embodiment, the updating unit 15 in the communication apparatus 10 serving as the transmission node of the second embodiment updates the set retransmission interval value based on a time determined as follows: the time is determined by subtracting the transmission time of USB data packets between the transmission of the transition request and the reception of the ACK signal corresponding to the transition request, from a time from the transmission of the transition request (i.e., the low-power consumption state transition request) to the reception of the ACK signal corresponding to the transition request.

The configuration of the communication apparatus 10 can prevent the set retransmission interval value from excessively increasing if USB data packets are transmitted between the retransmission flows of the transition request.

Another Embodiment (1) In the first embodiment, the set retransmission interval value is used each time a packet is retransmitted. The present invention is not limited to the set retransmission interval value. For example, in the first retransmission of a packet, a time interval from the first transmission of the packet to the first retransmission of the packet may be set longer than or equal to the set retransmission interval value. In the second retransmission or later, a packet may be retransmitted immediately after preparation for retransmission.

(2) In the first and third embodiments, during repeated retransmission of a signal to be transmitted, the retransmission is controlled according to the retransmission interval value calculated in the transmission of the previous signal to be transmitted. The present invention is not limited to the retransmission control. For example, the set retransmission interval values in the memory unit 14 may be applied to repeated retransmission based on a predetermined retransmission interval-value application pattern, the set retransmission interval values including a first set retransmission interval value that is continuously updated and a second set retransmission interval value that is a fixed interval value as described in the first and third embodiments the For example, the second set retransmission interval value set at a sufficiently small value may be used for the first retransmission, whereas the first set retransmission interval value may be applied to the second retransmission or later.

(3) In the first to third embodiments, the communication apparatus 10 is configured as a transmission node, whereas the communication apparatus 20 is configured as a reception node. Obviously, both of the communication apparatus 10 and the communication apparatus 20 may be configured as a transmission node and a reception node.

(4) For clarification of the explanation, the description and drawings are optionally omitted and simplified. Moreover, elements illustrated as functional blocks for various kinds of processing may include hardware such as a CPU, a memory, and other circuits and are implemented by programs loaded in the memory. Thus, a person skilled in the art could understand that these functional blocks can be implemented in various forms including hardware alone, software alone, or a combination of the hardware and software. The present invention is not limited to the forms of the functional blocks.

Furthermore, the programs are stored using various types of non-transitory computer readable media and can be supplied to a computer. The non-transitory computer readable media include various types of tangible storage media. The non-transitory computer readable media include a magnetic recording medium (e.g., a flexible disk, a magnetic tape, and a hard disk drive), a magneto-optical recording medium (e.g., a magneto-optical disk), a CD-ROM (Read Only Memory), a CD-R, a CD-R/W, a semiconductor memory (e.g., a mask ROM, a PROM (Programmable ROM), an EPROM (Erasable PROM), a flash ROM, and a RAM (Random Access Memory)). The programs may be supplied to a computer via various types of non-transitory computer readable media. The non-transitory computer readable media include an electrical signal, an optical signal, and an electromagnetic wave. The non-transitory computer readable media can supply programs to a computer through wire communication channels such as an electric wire and an optical fiber or radio channels.

The invention made by the inventors was specifically described according to the embodiments. Obviously, the present invention is not limited to the foregoing embodiments and can be changed in various manners without departing from the scope of the invention.

What is claimed is:

1. A Universal Serial Bus (USB) communication system comprising:
a transmitter that transmits a signal to an external receiver;
a receiver that receives, from the external receiver, a positive response signal or a negative response signal corresponding to the transmitted signal; and
a memory that stores a first retransmission interval time value that is used for retransmitting the signal to the external receiver when the receiver receives the negative response signal corresponding to the transmitted signal,
wherein the transmitter transmits a first signal to the external receiver,
wherein when the receiver receives a negative response signal corresponding to a first transmission of the first signal, the transmitter retransmits the first signal to the external receiver after the first retransmission interval time value elapses from a time of the first transmission of the first signal,
wherein when the receiver receives a negative response signal corresponding to a second transmission of the first signal, the transmitter retransmits the first signal to the external receiver after the first retransmission interval time value elapses from a time of the second transmission of the first signal,
wherein when the receiver receives a positive response signal corresponding to the second transmission of the first signal, a communication control unit of the USB communication system measures a first total time from the time of the first transmission of the first signal to a time of the reception of the positive response signal corresponding to the second transmission of the first signal, and
wherein an updating unit of the USB communication system updates the first retransmission interval time value stored in the memory to a second retransmission interval time value based on the measured first total time.

2. The USB communication system according to claim 1, wherein the second retransmission interval time value is determined by:
deriving a product of the first retransmission interval time value and a number of times the first signal was retransmitted; and
a sum of 1) a duration from a time of a third transmission of the first signal to the external receiver and 2) the derived product .

3. The USB communication system according to claim 1, wherein the transmitter transmits a second signal to the external receiver after the receiver receives the positive response signal corresponding to the second transmission of the first signal, and
wherein when the receiver receives a negative response signal corresponding to a first transmission of the second signal, the transmitter retransmits the second signal to the external receiver after the second retransmission interval time value elapses from a time of the first transmission of the second signal to the external receiver.

4. The USB communication system according to claim 3, wherein when the receiver receives a positive response signal corresponding to the first transmission of the second signal, the communication control unit measures a second total time from the first transmission of the second signal to the external receiver and to a time of the reception of the positive response signal corresponding to the first transmission of the second signal,
wherein the updating unit updates the second retransmission interval time value stored in the memory to a third retransmission interval time value based on the measured second total time, the measured second total time being less than the measured first total time, and wherein when the transmitter transmits a third signal to the external receiver and the receiver receives a negative response signal from the external receiver corresponding to a first transmission of the third signal, the transmitter retransmits the third signal to the external receiver based on the third retransmission interval time value.

5. The USB communication system according to claim 4, wherein the third retransmission interval time value equates to the second total time.

6. A Universal Serial Bus (USB) communication system comprising:
- a transmitter that transmits a first signal to an external receiver;
- a receiver that receives, from the external receiver, a positive response signal or a negative response signal corresponding to the transmitted first signal;
- a memory that stores a retransmission interval time value that is used for retransmitting the first signal to the external receiver,
- wherein when the receiver receives the negative response signal corresponding to a first transmission of the first signal, the transmitter retransmits the first signal after the retransmission interval time value elapses from of the first transmission of the first signal,
- wherein when the receiver receives a positive response signal corresponding to a second transmission of the first signal:
  - a counter of the USB communication system counts a number of retransmission performed from a time of the first transmission of the first signal to a time of the reception of the positive response signal corresponding to the second transmission of the first signal; and
  - a timer of the USB communication system tracks a period of time from a time of the second transmission of the first signal to the time of the reception of the positive response signal corresponding to the second transmission of the first signal, the timer being reset every time the first signal is retransmitted, and
  - a updating unit of the USB communication system updates the retransmission interval value based on a first updated value calculated based on an equation:

the first updated value=(the tracked period of time)+ (the retransmission interval value)×(the counted number of retransmission).

7. The USB communication system according to claim 6, wherein the first signal is a low-power consumption state transition request defined by a USB 3.1 standard.

8. The USB communication system according to claim 6, wherein the first signal is a transition request signal to a low power consumption state defined by a USB 3.1 standard,
wherein the positive response signal indicates an acceptation of the transition to the low power consumption state in response to the transition request signal, and
wherein the updating unit updates the stored retransmission interval value based on a time determined by subtracting a transmission time of a USB data packet between the transmission of the first signal and the reception of the positive response signal from the first total time.

9. A communication system comprising:
a memory unit that stores a retransmission interval value;
a communication control unit that transmits a first signal and receives a negative response signal or a positive response signal corresponding to the first signal from a receiver, wherein when the negative response signal corresponding to the first signal is received, the communication control unit retransmits the first signal at a time interval longer than or equal to the stored retransmission interval value after the transmission of the first signal;
a counter that counts a number of retransmission performed from a time of the transmission of the first signal to a time of the reception of the positive response signal corresponding to the first signal;
a timer that tracks a period of time from a time of a current transmission of the first signal to the time of the reception of the positive response signal corresponding to the first signal, wherein the timer is reset when the first signal is retransmitted; and
an updating unit that, when the positive response signal corresponding to the first signal is received, updates the stored retransmission interval value based on a first updated value calculated based on an equation:

the first updated value=(the tracked period of time)+ (the stored retransmission interval value)×(the counted number of retransmission).

* * * * *